(12) United States Patent
Adams et al.

(10) Patent No.: US 9,669,693 B1
(45) Date of Patent: Jun. 6, 2017

(54) TRUCK BODY PROTECTOR APPARATUS

(71) Applicants: David Adams, Round Rock, TX (US); Tammie Adams, Round Rock, TX (US)

(72) Inventors: David Adams, Round Rock, TX (US); Tammie Adams, Round Rock, TX (US)

( * ) Notice: Subject to any disclaimer, the term of this patent is extended or adjusted under 35 U.S.C. 154(b) by 0 days.

(21) Appl. No.: 15/009,009

(22) Filed: Jan. 28, 2016

(51) Int. Cl.
*B60J 11/00* (2006.01)
*B60J 11/02* (2006.01)

(52) U.S. Cl.
CPC ..................... *B60J 11/02* (2013.01)

(58) Field of Classification Search
CPC . B60J 11/06; B60J 11/025; B60J 11/02; B60J 11/00; B60R 13/01; B60R 13/04
See application file for complete search history.

(56) References Cited

U.S. PATENT DOCUMENTS

| | | | | |
|---|---|---|---|---|
| 4,253,785 A | * | 3/1981 | Bronstein | B60P 7/0815 114/218 |
| 4,530,519 A | * | 7/1985 | Marshall | B60J 11/025 280/770 |
| 4,561,685 A | * | 12/1985 | Fischer | B60R 13/04 280/770 |
| 4,997,227 A | * | 3/1991 | Falzone | B60R 13/01 150/166 |
| 5,050,925 A | * | 9/1991 | Brown | B60J 11/06 293/128 |
| 5,290,618 A | * | 3/1994 | Olson | B60J 11/06 150/166 |
| 5,470,642 A | * | 11/1995 | Egigian | B60R 13/01 293/1 |
| 5,636,883 A | * | 6/1997 | Johns | B60J 11/06 150/166 |
| 5,641,179 A | | 6/1997 | Imlach | |
| 5,776,572 A | * | 7/1998 | Lipson | B05B 15/0456 118/504 |
| 5,788,307 A | | 8/1998 | Gilbert | |
| 5,799,975 A | * | 9/1998 | Crick | B25H 3/04 150/166 |
| 5,868,425 A | * | 2/1999 | McNulty | B60J 11/06 150/166 |
| 5,938,263 A | | 8/1999 | Barthelman | |
| 5,945,194 A | * | 8/1999 | Pester | B60J 11/06 150/166 |
| 6,572,949 B1 | * | 6/2003 | Lewis | B05B 15/0456 118/505 |
| D494,904 S | * | 8/2004 | Dishong | D12/190 |

* cited by examiner

*Primary Examiner* — Hau Phan
(74) *Attorney, Agent, or Firm* — Stevenson IP, LLC

(57) ABSTRACT

A truck body protector apparatus including at least one elongated rectangular mounting plate affixed to a top surface of one of a pair of sidewalls of a pickup truck. An interior surface of a rectangular flexible fabric sheet proximal a top end of the sheet is disposed on an entirety of an upper surface of the at least one mounting plate. A height of the sheet is configured to cover an external surface of one of the pair of sidewalls. A weighted rod is continuously attached to a bottom end of the sheet. A pair of hook and loop cinch straps is secured between the upper surface of the at least one mounting plate and the interior surface of the sheet. The sheet has a rolled position and an alternate unrolled position.

6 Claims, 4 Drawing Sheets

US 9,669,693 B1

TRUCK BODY PROTECTOR APPARATUS

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of protectors for truck bodies are known in the prior art. However, what has been needed is a truck body protector apparatus including at least one elongated rectangular mounting plate affixed to a top surface of one of a pair of sidewalls of a pickup truck. What has been furthered need is an interior surface of a rectangular flexible fabric sheet proximal a top end of the sheet disposed on an entirety of an upper surface of the at least one mounting plate. A height of the sheet is configured to cover an external surface of one of the pair of sidewalls. A weighted rod continuously attached to a bottom end of the sheet. Lastly, what has been needed is a pair of hook and loop cinch straps secured between the upper surface of the at least one mounting plate and the interior surface of the sheet. The sheet has a rolled position and an alternate unrolled position. The truck body protector apparatus thus protects at least one of a pair of sidewalls of a pickup truck from receiving scratches and dents while a user loads and unloads equipment and tools into and out of the bed of the pickup truck.

FIELD OF THE INVENTION

The present invention relates to protectors for truck bodies, and more particularly, to a truck body protector apparatus.

SUMMARY OF THE INVENTION

The general purpose of the present truck body protector apparatus, described subsequently in greater detail, is to provide a truck body protector apparatus which has many novel features that result in a truck body protector apparatus which is not anticipated, rendered obvious, suggested, or even implied by prior art, either alone or in combination thereof.

To accomplish this, the present truck body protector apparatus includes at least one elongated rectangular mounting plate affixed to a top surface of one of a pair of sidewalls of a pickup truck. The at least one mounting plate has an upper surface, a lower surface, an outer surface, an inner surface, a front side, and a back side. The at least one mounting plate is optionally two mounting plates, in order to cover the top surface of each of the pair of sidewalls of the pickup truck. The at least one mounting plate is also optionally aluminum. A length of the at least one mounting plate substantially conforms to a length of each of the pair of sidewalls. A rectangular flexible fabric sheet, which is optionally vinyl, has a top end, a bottom end, an exterior surface, and an interior surface. The interior surface proximal the top end of the sheet is disposed on an entirety of the upper surface of the at least one mounting plate. A length of the sheet substantially conforms to the length of the at least one mounting plate. A height of the sheet is configured to cover an external surface of one of the pair of sidewalls. A weighted rod is continuously attached to the bottom end of the sheet, with a length of the weighted rod equal to the length of the sheet.

The truck body protector apparatus further includes a pair of hook and loop cinch straps including a front hook and loop cinch strap and a back hook and loop cinch strap. The front hook and loop cinch strap is secured between the upper surface of the at least one mounting plate and the interior surface of the sheet proximal the front side of the at least one mounting plate. The back hook and loop cinch strap is secured between the upper surface of the at least one mounting plate and the interior surface of the sheet proximal the back side of the at least one mounting plate. The sheet has a rolled position and an alternate unrolled position. The sheet is in the rolled position when the sheet is rollably positioned atop the top surface of one of the pair of sidewalls and selectively secured to the top surface of one of the pair of sidewalls with the pair of hook and loop cinch straps. The sheet is in the unrolled position when the sheet is disposed atop the external surface of one of the pair of sidewalls. Unlike other protectors for truck bodies, the truck body protector apparatus is thus easily storable when not in use.

Thus has been broadly outlined the more important features of the present truck body protector apparatus so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
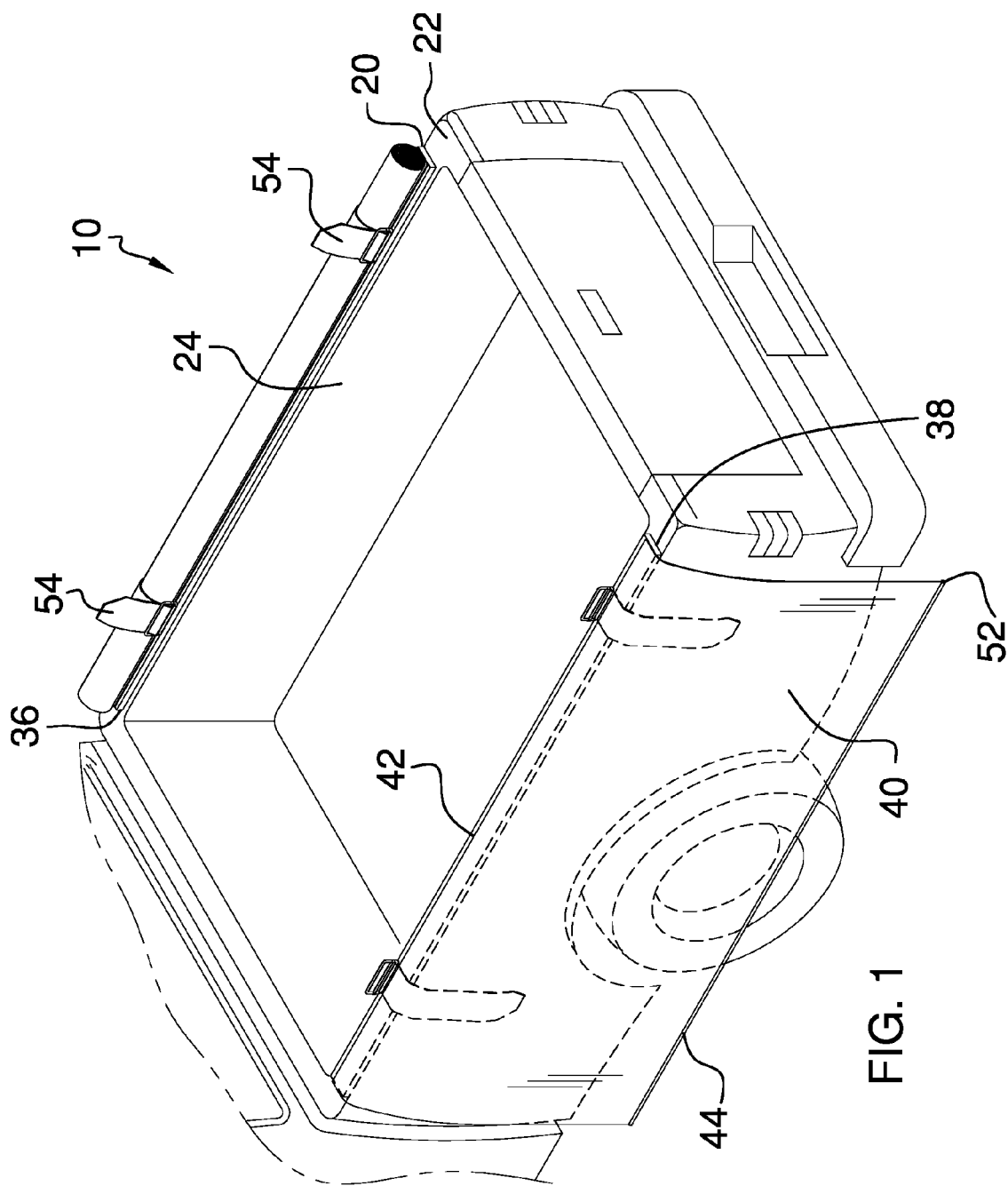
FIG. 1 is an isometric view.
Figure 2:
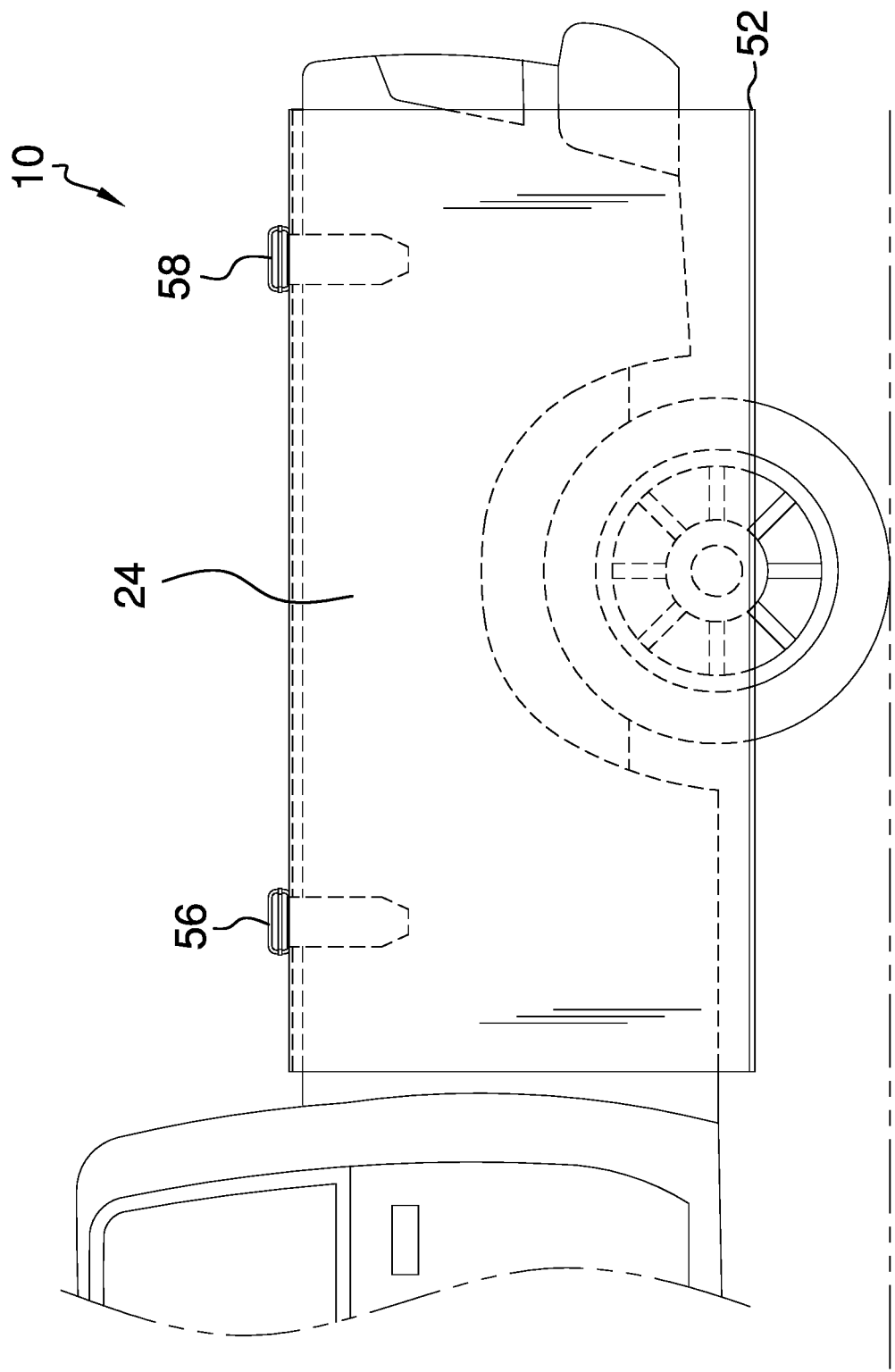
FIG. 2 is a front elevation view.
Figure 3:
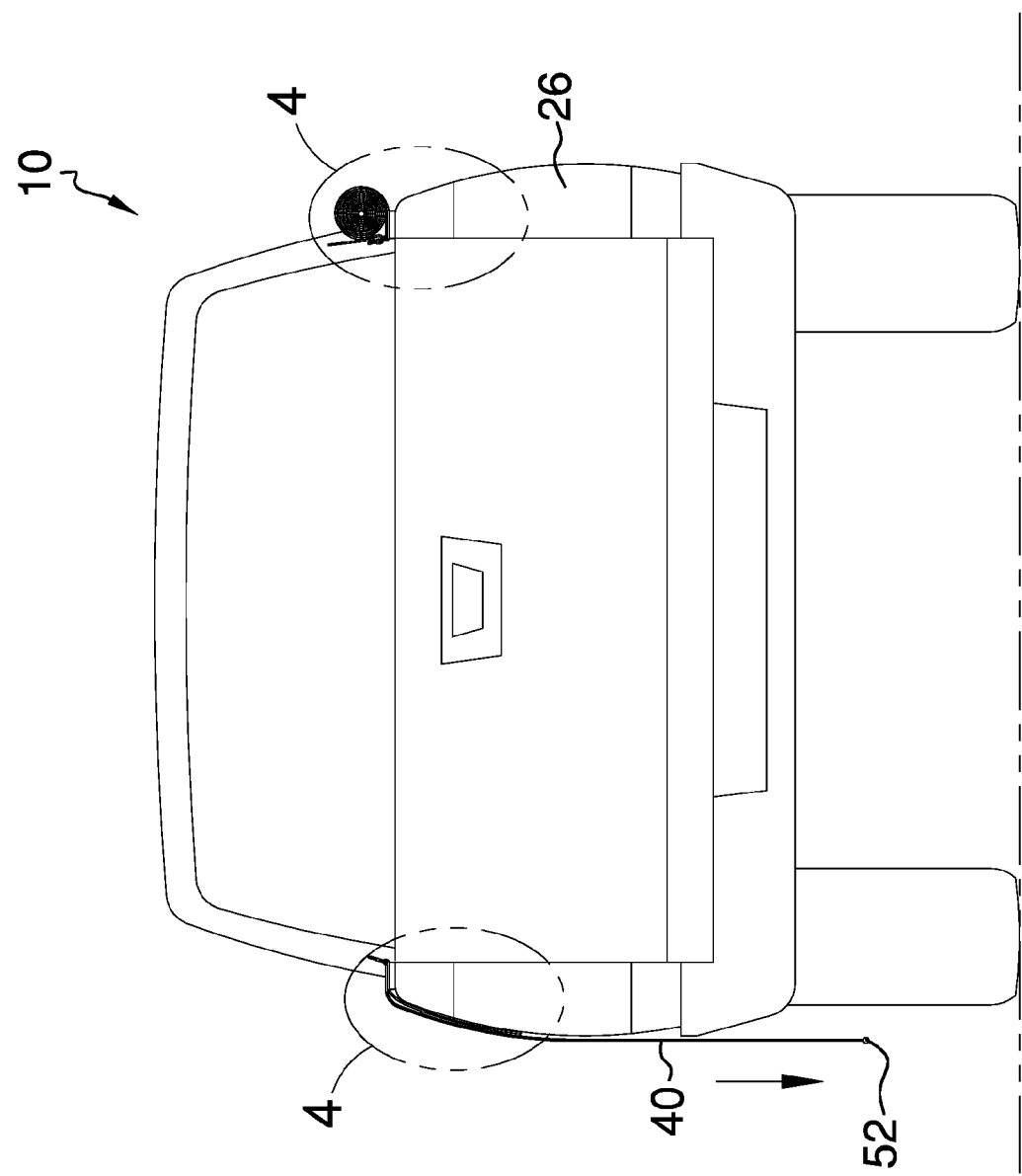
FIG. 3 is a side elevation view.

With reference now to the drawings, and in particular FIGS. 1 through 4 thereof, an example of the instant truck body protector apparatus employing the principles and concepts of the present truck body protector apparatus and generally designated by the reference number 10 will be described.

Referring to FIGS. 1 through 4 the present truck body protector apparatus 10 is illustrated. The truck body protector apparatus 10 includes at least one elongated rectangular mounting plate 20 affixed to a top surface 22 of one of a pair of sidewalls 24 of a pickup truck 26. The at least one mounting plate 20 has an upper surface 28, a lower surface 30, an outer surface 32, an inner surface 34, a front side 36, and a back side 38. The at least one mounting plate 20 is optionally two mounting plates. The at least one mounting plate 20 is also optionally aluminum. A length of the at least one mounting plate 20 from the front side 36 to the back side 38 substantially conforms to a length of each of the pair of sidewalls 24. A rectangular flexible fabric sheet 40, which is optionally vinyl, has a top end 42, a bottom end 44, an exterior surface 46, and an interior surface 48. The interior surface 48 proximal the top end 42 of the sheet 40 is disposed on an entirety of the upper surface 28 of the at least one mounting plate 20. A length of the sheet 40 substantially conforms to the length of the at least one mounting plate 20. A height of the sheet 40 from the top end 42 to the bottom end 44 is configured to cover an external surface of one of the pair of sidewalls 24. A weighted rod 52 is continuously attached to the bottom end 44 of the sheet 40, with a length of the weighted rod 52 equal to the length of the sheet 40.

Figure 4:
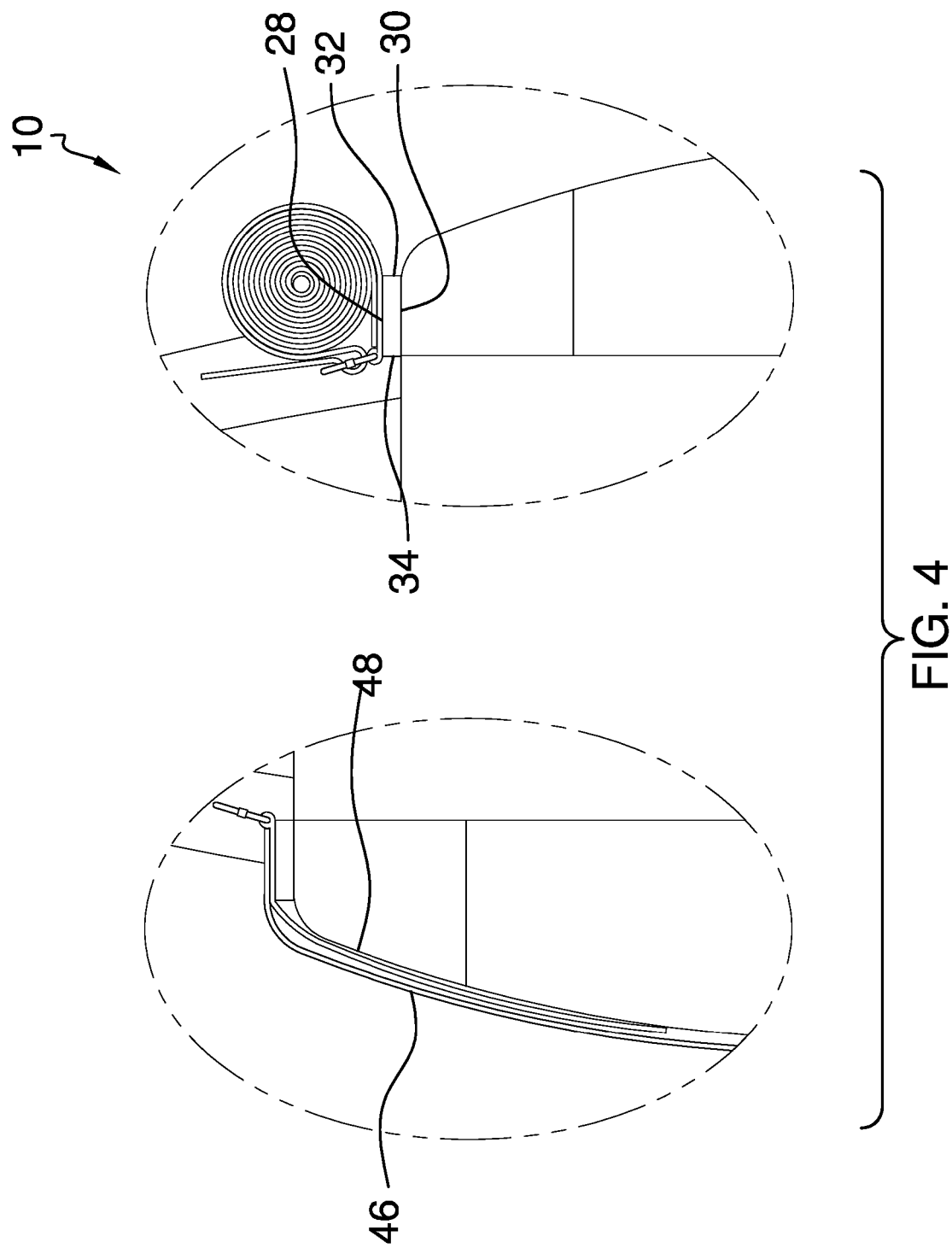
FIG. 4 is a detail view.

The truck body protector apparatus 10 further includes a pair of hook and loop cinch straps 54 including a front hook and loop cinch strap 56 and a back hook and loop cinch strap 58. The front hook and loop cinch strap 56 is secured between the upper surface 28 of the at least one mounting plate 20 and the interior surface 48 of the sheet 40 proximal the front side 36 of the at least one mounting plate 20. The back hook and loop cinch strap 58 is secured between the upper surface 28 of the at least one mounting plate 20 and the interior surface 48 of the sheet 40 proximal the back side 38 of the at least one mounting plate 20. As best shown in FIG. 4, the sheet 40 has a rolled position and an alternate unrolled position. The sheet 40 is in the rolled position when the sheet 40 is rollably positioned atop the top surface 22 of one of the pair of sidewalls 24 and selectively secured to the top surface 22 of one of the pair of sidewalls 24 with the pair of hook and loop cinch straps 54. The sheet 40 is in the unrolled position when the sheet 40 is disposed atop the external surface 50 of one of the pair of sidewalls 24.

What is claimed is:

1. A truck body protector apparatus comprising:
   at least one elongated rectangular mounting plate affixed to a top surface of one of a pair of sidewalls of a pickup truck, the at least one mounting plate having an upper surface, a lower surface, an outer surface, an inner surface, a front side, and a back side, wherein a length of the at least one mounting plate from the front side to the back side substantially conforms to a length of each of the pair of sidewalls;
   a rectangular flexible fabric sheet having a top end, a bottom end, an exterior surface, and an interior surface, wherein the interior surface proximal the top end is disposed on an entirety of the upper surface of the at least one mounting plate, wherein a length of the sheet substantially conforms to the length of the at least one mounting plate, wherein a height of the sheet from the top end to the bottom end is configured to cover an external surface of one of the pair of sidewalls;
   a weighted rod continuously attached to the sheet bottom end, wherein a length of the weighted rod is equal to the length of the sheet; and
   a pair of hook and loop cinch straps comprising a front hook and loop cinch strap and a back hook and loop cinch strap, wherein the front hook and loop cinch strap is secured between the at least one mounting plate upper surface and the sheet interior surface proximal the at least one mounting plate front side, and the back hook and loop cinch strap is secured between the at least one mounting plate upper surface and the sheet interior surface proximal the at least one mounting plate back side;
   wherein the sheet has a rolled position and an alternate unrolled position;
   wherein the sheet is in the rolled position when the sheet is rollably positioned atop the top surface of one of the pair of sidewalls and selectively secured to the top surface of one of the pair of sidewalls with the pair of hook and loop cinch straps;
   wherein the sheet is in the unrolled position when the sheet is disposed atop the external surface of one of the pair of sidewalls.

2. The truck body protector apparatus of claim 1 wherein the at least one mounting plate is aluminum.

3. The truck body protector apparatus of claim 2 wherein the sheet is vinyl.

4. The truck body protector apparatus of claim 1 wherein the at least one mounting plate is two.

5. The truck body protector apparatus of claim 4 wherein the at least one mounting plate is aluminum.

6. The truck body protector apparatus of claim 5 wherein the sheet is vinyl.

* * * * *